2,660,281

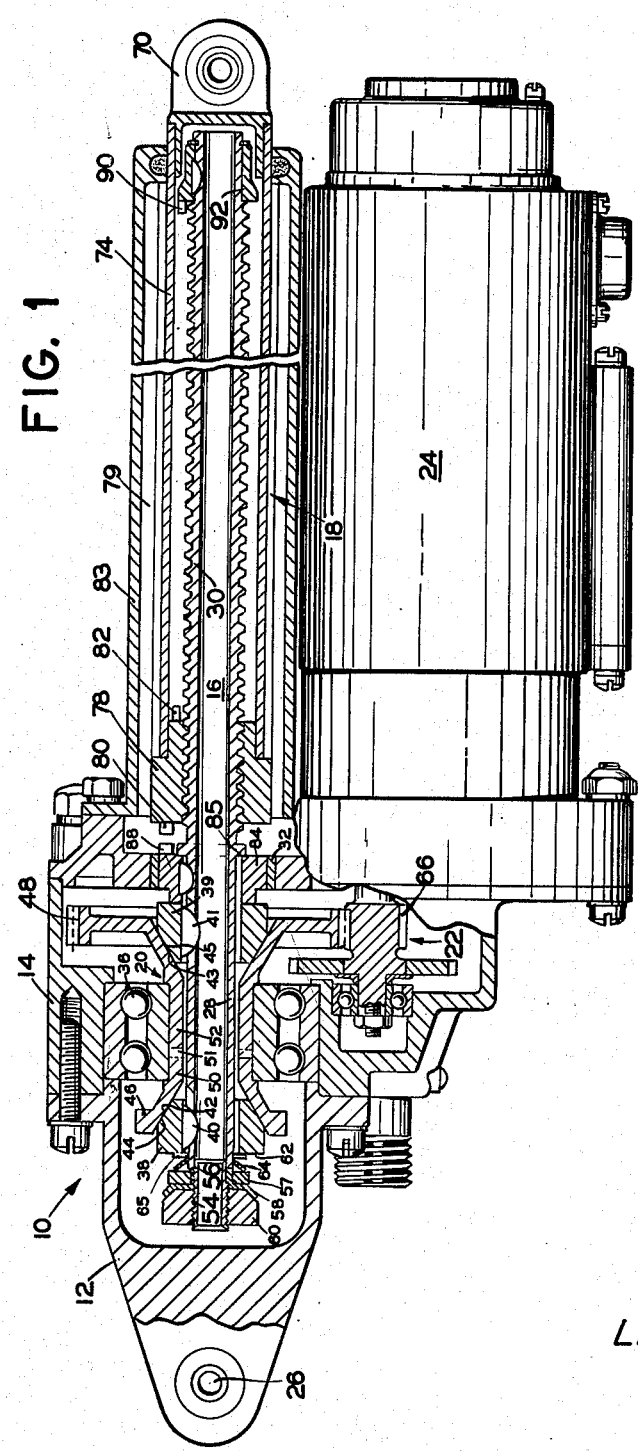
Nov. 24, 1953 — L. OCHTMAN — 2,660,281
SLIP CLUTCH FOR SCREW ACTUATORS
Filed Feb. 25, 1949
INVENTOR.
LEONARD OCHTMAN
ATTORNEY Patented Nov. 24, 1953

UNITED STATES PATENT OFFICE 2,660,281

SLIP CLUTCH FOR SCREW ACTUATORS

Leonard Ochtman, Ridgewood, N. J., assignor to Bendix Aviation Corporation, Teterboro, N. J., a corporation of Delaware Application February 25, 1949, Serial No. 78,363

5 Claims. (Cl. 192—141)

The present invention relates generally to actuators and more particularly to a travel limiting clutch for an actuator of the screw jack type.

The actuator described herein, as an example of an effective application of the present invention, is constituted substantially as a longitudinally extensible link comprising an axially relatively movable housing and an elongated arm adapted to operate an element of an airplane such as a tab or a flap, but having, of course, many other applications.

In connection with such applications, the actuator is ordinarily provided with mechanical stops at one or both extreme positions in order to prevent over-travel of the members operated thereby. This, of course, results in a sudden arrest of motion of the operating parts of the actuator and may cause undue stresses and excessive wear thereof. In order to reduce the shock-load, it has been common practice to de-energize the driving mechanism just prior to the contact of the respective stops, but even so the resulting shock load has been a cause of concern to designers. If, for some reason, the driving mechanism is not cut off prior to the contact of the stops, failure of parts is likely to occur unless the parts of the actuator are designed much heavier than necessary for normal operation.

One object of the present invention is to provide a simple, effective and novel clutch for an actuator which will prevent overloading of the operating mechanism thereof, if the driving power is not cut off prior to the contact of the stop members.

Another object is to provide a simple, effective and novel clutch which will protect the operating mechanism against excessive wear due to sudden stops and reversals thereof.

Another object is to provide a clutch for an actuator of the screw jack type which utilizes the thrust of the jack screw for loading the friction surfaces whereby such friction surfaces and loading springs may be made very small.

Still another object is to provide novel means for preloading the friction surfaces of an actuator clutch in order to ensure positive gripping action therebetween in the absence of thrust on the jack screw.

Still another object is to provide an actuator wherein the stops of the extensible member are arranged so as not to cause additional thrust on the screw member upon engagement thereof.

Still another object is to provide a clutch of the above-mentioned character which is simple and durable in construction, economical to manufacture and effective in its operation.

These and other objects and features of the invention are pointed out in the following description in terms of the illustrated embodiments thereof which are shown in the accompanying drawing. It is understood, however, that the illustrations are for the purpose of example only and are not intended as a definition of the limits of the invention, reference being had to the appended claims for this purpose.

In the drawings:

Figure 1 is a side view partially in elevation and partially in section of an actuator embodying the travel limiting clutch and other features of the present invention.

Figure 2 shows a modification of the clutch surfaces shown in Figure 1.

The device shown in Figure 1 comprises in general a housing 10 having housing portions 12 and 14 enclosing an actuator of the screw jack type comprising a hollow screw shaft 16, extendable arm 18, clutch 20, gear train 22, and the driving means generally indicated at 24.

The device as a whole is adapted to be pivotally mounted on a suitable base as by a bolt extending through a hole 26 in the housing portion 12. The screw shaft 16 comprises a shank portion 28 and screw portion 30 and is journaled to the housing 10 by bearing 32 and through the clutch 20 by ball bearings 36.

Annular ring members 38 and 39 are keyed to the shank portion 28 by keys 40 and 41 respectively in such a manner that the rings will rotate with the shaft but are free to slide longitudinally thereon. Ring members 38 and 39 have cone-shaped surfaces 42 and 43 respectively facing each other and adapted to mate with corresponding cone-shaped surfaces 44 and 45 of driving ring 46 and driving gear 48 respectively. The driving ring 46 has a hub portion 50 provided with jaw teeth adapted to engage corresponding jaw teeth 51 of the hub portion 52 of the driving gear 48, but they may of course be jointed by any convenient means. In the construction shown in the drawing, the inner race of bearing 36 is securely held between the hub portions of the driving gear ring 46 and driving gear 48, and in a recess formed therein.

The outer race of bearing 36 is mounted between the housing portions 12 and 14 as shown in the drawings so as to be able to resist axial thrust in either direction.

The threaded end portion of the shaft 16 is of a smaller diameter than the shaft thus providing a shoulder 56 against which washer 57 and the lock washer 58 are held by a nut 60. Between washer 57 and a back face 62 of ring 38 is clamped one or more belleville springs 64 in order to exert a pressure against ring 38 which pressure is in turn transmitted to the mating cone surfaces 42, 44 and 43, 45, the purpose of which will be apparent as the description proceeds. The tension and gap of spring 64 may be adjusted by inserting one or more shims 65.

Driving gear 48 is shown as being driven from the driving means 24, which may be an electric motor, through a pinion 66.

The extendable arm 18 is shown in the drawing provided with terminal means 70 for connection with the member of the airplane to be operated, either directly or through a linking mechanism. The terminal 70 may be brazed or otherwise secured to one end of a tube 74 which surrounds the screw portion 30 of the shaft 16 and has its other end secured to an internally threaded nut 78 adapted to cooperate the threads of the screw portion 30. The nut 78 is shown as being provided with stop lugs 80 and 82.

The back face of ring member 39 abuts a sleeve 84 which is keyed to shank portion 28 of shaft 16 and is kept in position as by a collar 85 made integrally with the shaft. Sleeve 84 which may be made integrally with the shaft 16 is adapted to rotate within bearing 32, and is provided with a stop lug 88 adapted to engage stop lug 80 of nut 78. A similar stop lug 90 is secured to a ring member 92 which is splined or otherwise secured to the extreme end of screw portion 30 of the shaft 16 in order to fix the outward limit of travel of the nut 78.

Figure 2 illustrates a modification of the clutch 20 of Figure 1, like reference numerals indicating corresponding parts, in which the clutch friction surfaces are shown as disc-shaped surfaces 94, 95 and 96, 97. Gear 48a is supported on the shank portion 28 of the shaft 16 by a bushing 98 which may be press fitted in the hub 52a.

The operation of the device is as follows:

The screw shaft 16 is driven from driving means 24 through a gear train 22, comprising the driving gear 48 and output pinion 66 and clutch 20 whereby the arm 18 is forced to the right by the interaction between the threads of the screw shaft and the threads of the nut 78 which nut is constrained from rotation by the member of the aircraft to be operated or by a spline in the extended housing portion 83. The backward thrust resulting from the force applied by the terminal means 70 against the member to be operated upon is transmitted through the collar 85, sleeve 84 and driving ring 39 to the cone-shaped surfaces 43 and 45 of the clutch 20. It should be noted that the friction between these surfaces is proportional to the backward thrust against shaft 16 and will prevent the clutch from slipping as the load increases. The diameter and angle of the cone surfaces may be so proportioned that with normal friction coefficients the effective torque capacity of the friction surfaces will always be substantially higher than the driving torque required. It should be noted that the driving torque is directly proportional to the thrust on the driving screw and that the torque capacity is a direct function of the thrust imposed on the screw by the working load. The cone may be made to have any degree of angle required for a particular design of the actuator, and it may even divert from a cone-shape altogether if flat driving surfaces such as shown in Figure 2 would better meet individual requirements.

The nut 78 will continue to drive the arm 18 to the right, unless the driving means 24 is de-energized or disengaged, until the stop lug 82 of the nut 78 engages the stop lug 90 of the ring member 92 thereby preventing the shaft from further rotation. The illustrated cooperating stop lugs 80, 88, and 82, 90 may, of course, be substituted by other convenient means for arresting the relative axial movement between the shaft 16 and the extendable arm 18 which do not thereby increase the external thrust on the shaft and friction surfaces. Suitable means are provided for de-energizing the driving means 24 or disengaging it from the gear train 22 just prior to the engagement of the stop jaws but as such means are well known in the art and form no part of the present invention detailed description thereof has been omitted in order to render a more clear description of the invention.

When further turning of the shaft 16 is prevented by the contact of the stop lugs 82 and 90, the backward thrust on the shaft is not thereby increased and the force applied against the cone surfaces 43 and 45 will not be affected. If the driving power is not shut off or if the kinetic energy left in the gear train 22 and driving means 24 is sufficient to continue to apply force to the clutch the cone surfaces will slip with respect to each other thus preventing excessive loading on the shaft and associated parts.

When it is desired to return the arm 18 to its retracted position, the driving means 24 is reversed thus forcing the nut 78 and arm 18 to travel towards the left as viewed in the drawing. This results in an outward axial thrust on the shaft which thrust is transmitted to friction surfaces 42 and 44 through washer 65 and compressed spring 64. As was previously pointed out, the driving ring member 38 is mounted on the shaft 16 in such a manner that the ring will turn with the shaft but is free to slide longitudinally thereon. The driving torque between the friction surfaces 42 and 44 and thus between the clutch 20 and shaft 16 is proportional to the axial outward thrust on the shaft 16 and the same considerations apply in this case as those discussed in connection with the driving surfaces 43 and 45.

In the particular embodiments of the invention illustrated in the drawing, the friction surfaces are shown to be symmetrical, while in certain applications it may be found advantageous to make one cone surface steeper or larger than the other depending on the requirements of the particular case. It may even be found preferable to combine the features shown in Figures 1 and 2 thus making one friction surface cone-shaped and the other disc-shaped.

One or more springs 64 are placed between the washer 57 and the back surface 62 of the slidable ring 38 in order to preload the friction surfaces so as to prevent them from slipping when no axial thrust on the shaft is present in either direction. The amount of preloading needed will depend on the requirements of the particular actuator in question. Clutch shims 65 are provided for adjusting the gap of the spring 64. It has been found that satisfactory operation is obtained if the spring is compressed within 0.003 of an inch of its fully compressed state.

Although only two embodiments of the invention have been shown and described, it is to be understood that these are to be taken only as preferred examples of the invention and that various changes in the shape, size and arrangement of parts may be resorted to without departing from the true scope of the invention or the appended claims.

What is claimed is:

1. In an actuator, the combination of a housing having an actuator pivot mounting end, a reversibly rotatable shaft including a longitudinal inner end section journaled in said housing adjacent to said pivot end, said section carrying an outer end clutch jaw and the shaft having an outer end screw portion protruding from said jaw, an elongated element along said screw having an outer end constituting the other actuator pivot mounting end and embodying an inner end nut on said screw, said section having a clutch jaw complemental to said first clutch jaw, said section including a length of reduced diameter providing a shoulder axially inwardly of said jaws and a screw shank of further reduced diameter providing a stop axially inwardly of said shoulder, a pair of rings axially spaced from each other around and secured to said length for rotation therewith and axial movement relative thereto and having peripheral friction surfaces axially facing each other, one of said rings being backed by said shoulder, a bearing held to said housing axially intermediate said surfaces and adapted to resist thrust in each axial direction, driving gear and annulus members around said length axially embracing said bearing between said rings and having friction surfaces complemental to said ring friction surfaces, respectively, said gear and annulus being connected for rotation with and axial movement relative to each other, shim means next to the other of said rings and spring means next to said shim means around said length, and a washer against said stop next to said spring means, a washer lock next to said washer, and a nut next and locked to said lock around said screw shank.

2. The combination of a reversibly rotatable shaft, means associated with said shaft to selectively subject said shaft to opposite axial thrust loads, elements axially spaced from each other around and connected to said shaft for rotation therewith and axial movement relative thereto and having axially oppositely facing friction surfaces, means adapted to resist thrust in opposite directions, driving members around said shaft engageable with said thrust resisting means and having friction surfaces complemental to said element friction surfaces, respectively, said driving members connected to each other for simultaneous rotation and having their axial movement limited by said thrust resisting means in a direction tending to engage said complemental friction surfaces to said element friction surfaces, means including axially yieldable means providing a preload between said complemental and element friction surfaces, and means including said shaft for increasing said bias in proportion to the axial thrust on said shaft.

3. In combination, a shaft, means engaged with said shaft to selectively subject said shaft to each of opposite axial thrust loads, a base, the shaft and the base being adapted for rotative movements relative to each other, torque limiting elements carried by and axially movable on said shaft and having friction faces, shaft driving elements engageable with and held axially by said base having friction surfaces adapted to engage said friction faces respectively, means axially biasing said torque limiting elements into engagement with said driving elements to establish a predetermined initial load on the associated friction surfaces and faces, and means including said shaft for increasing said bias in proportion to the axial thrust on said shaft.

4. In an actuator, the combination of a reversibly rotatable shaft including a threaded section and a mounting section, an annular member coaxial with said shaft and extending over a portion of said mounting section, said annular member having friction surfaces facing axially opposite each other, means for rotatably mounting said annular member to resist thrust in each axial direction, a driving gear operatively connected to said annular member, a pair of rings axially spaced from each other by said annular member around and secured to said shaft for rotation with and axial movement relative thereto, said rings having friction surfaces axially facing each other and adapted to engage the friction surfaces of said annular member, yieldable means for biasing said rings into engagement with said annular member for a predetermined load, and means including said shaft for increasing said bias in proportion to the axial thrust on said shaft.

5. In an actuator, the combination of an end structure having attaching means, driving means including an annular clutch member rotatably mounted in said structure and secured against axial movement relative thereto, a reversibly rotatable shaft including a longitudinal inner end section journaled in said annular clutch member and a screw section protruding from said clutch member, a movable element along said screw having means for attaching the other end of the actuator, a nut attached thereto and adapted to engage said screw for axial movement relative thereto, a pair of rings axially spaced from each other by said annular clutch member around and secured to said section for rotation therewith and axial movement relative thereto and having friction surfaces axially facing each other, one of said rings being backed by a shoulder on said section axially inward of said annular clutch member, adjustable yieldable means between the inner end of said section and the other of said rings to bias said ring friction surfaces into engagement with said annular clutch member for transmission of a predetermined torque, and means including said screw section for increasing the bias on said ring friction surfaces in response to axial load thrust.

LEONARD OCHTMAN.

References Cited in the file of this patent

UNITED STATES PATENTS

| Number | Name | Date |
|---|---|---|
| 1,231,638 | Nikonow | July 3, 1917 |
| 1,517,285 | Fishedick et al. | Dec. 2, 1924 |
| 2,259,437 | Dean | Oct. 21, 1941 |
| 2,379,878 | Bronander | July 10, 1945 |
| 2,391,470 | May | Dec. 25, 1945 |
| 2,407,537 | Chapman | Sept. 10, 1946 |
| 2,410,695 | Warner | Nov. 5, 1946 |
| 2,479,019 | Ochtman | Aug. 16, 1949 |
| 2,480,212 | Baines | Aug. 30, 1949 |

FOREIGN PATENTS

| Number | Country | Date |
|---|---|---|
| 328,888 | Germany | Nov. 8, 1920 |